United States Patent [19]

Shenker

[11] Patent Number: 5,645,620

[45] Date of Patent: Jul. 8, 1997

[54] SYSTEM FOR SEPARATING PARTICULATES AND CONDENSABLE SPECIES FROM A GAS STREAM

[75] Inventor: Jack David Shenker, Kinnelon Morris, N.J.

[73] Assignee: Foster Wheeler Development Corp., Clinton, N.J.

[21] Appl. No.: 450,511

[22] Filed: May 25, 1995

[51] Int. Cl.$^6$ ................................................ B01D 50/00

[52] U.S. Cl. ........................... 55/267; 55/269; 55/337; 95/268; 95/288

[58] Field of Search ........................... 55/267, 268, 269, 55/320, 337, 466, 523; 95/268, 288; 422/169, 173

[56] References Cited

U.S. PATENT DOCUMENTS

| | | | |
|---|---|---|---|
| 2,400,645 | 5/1946 | Huff | 95/268 |
| 3,917,458 | 11/1975 | Polak | 422/169 |
| 4,764,190 | 8/1988 | Israelson et al. | 55/269 |
| 4,865,627 | 9/1989 | Dewitz et al. | 55/337 |
| 4,932,334 | 6/1990 | Patte et al. | 55/269 |
| 5,284,498 | 2/1994 | Davis et al. | 55/269 |
| 5,460,788 | 10/1995 | Hyppanen et al. | 55/269 |
| 5,474,584 | 12/1995 | Beckwith et al. | 55/268 |

FOREIGN PATENT DOCUMENTS

| | | | |
|---|---|---|---|
| 2836772 | 2/1980 | Germany | 55/337 |
| 780862 | 11/1980 | U.S.S.R. | 55/337 |

*Primary Examiner*—C. Scott Bughey
*Attorney, Agent, or Firm*—Martin Smolowitz

[57] ABSTRACT

A system for separating particulate solids and condensable vapor materials from a hot feed gas stream such as a fuel gas containing such materials, so as to provide a clean gas product stream. The system includes a cyclone-type separator in which coarser particulate solids are removed downwardly, and an overhead gas stream containing a reduced concentration of finer particles is passed through a cooling step such as a heat exchanger for solidification and removal of condensable materials, and then passed to a filter vessel. In the filter vessel, the cooled gas and solidified particles pass through a filtering surface for further removal of the finer particles and solidified materials, after which the cleaned product gas is removed through an upper outlet connection. The coarse particles from the cyclone separator are passed downwardly through a conduit to the filter vessel lower portion where they are mixed with the finer particles removed by the filter surface, after which both fine and coarse size particles are withdrawn from the lower portion of the filtering vessel. The invention also provides a method for separating particulate solids and condensable species from a feed gas stream such as a fuel gas at 500°–1800° F. temperature and 50–500 psig pressure, and containing solid particle size distributions with top sizes of 50–4,000 microns in solids concentrations of 0.5–80 wt. percent.

11 Claims, 2 Drawing Sheets

SYSTEM FOR SEPARATING PARTICULATES AND CONDENSABLE SPECIES FROM A GAS STREAM

BACKGROUND OF INVENTION

This invention pertains to a system for separating particulate solids and condensable vapors from a gas stream. It pertains particularly to such a system which utilizes a cyclone separator, gas cooler and solids filter such that the coarser particulate solids are removed in the separator upstream of the gas cooler and are collected in a filter vessel together with filtered finer solids mixture to promote uniform withdrawal of the solids from the filter vessel.

Many devices and methods have been developed for separation of fine particulate solid materials from gases, such as from hot combustion gases containing such particles. For example, U.S. Pat. No. 2,400,645 to Huff discloses a system for separating catalyst particles from gases containing such particles by utilizing a cyclone separator from which cleaned overhead gas is passed upwardly through a filtering zone formed by a bed of larger and smaller particles arranged in series. U.S. Pat. No. 4,110,088 to Cold et al discloses apparatus for removing water-soluble pollutants and particles from flue gases by utilizing a gas solids separator having a spray chamber located upstream of a cyclone separator and a downstream distillation tower. U.S. Pat. No. 4,750,916 to Svensson discloses a gas-solids separator device utilizing precooling and aftercooling steps before and after filtration and electrostatic precipitation steps. U.S. Pat. No. 4,865,629 to Zievers et al discloses a process for filtering fine particles from a hot gas stream by utilizing two cyclone separators located upstream of a filter. Also, U.S. Pat. No. 5,215,553 to Herman et al discloses a two-stage mechanical separator having a concentric swirl section provided upstream of a cyclone separator. Although these known gas-solids separation devices have been found useful, they have various disadvantages so that further improvements in separation of particulate solids and condensable liquid fractions from hot feed gases is desired.

SUMMARY OF INVENTION

The system according to the invention is provided for removing solid particles and condensable vapor species from a gas/particulate solids stream such as a fuel gas stream containing same, so as to provide a clean product gas stream. The system is useful for such gas feed streams provided at temperatures between about 300° F. and 2,500° F. at pressures between 1 psig and 600 psig, and containing particulate solids in a solids/gas weight ratio range between at least 0.05/1 and up to 10/1. The size range for particle distribution contained in the gas feed stream is at least about 50 microns and may be up to about 4,000 microns.

In the system, the combined gas/particulate solids stream containing the particulate solids is introduced into a cyclone type gas-solids separator in which a major portion of the larger size particles are captured and flow downwardly through a lower outlet conduit. The portion of the coarser larger particles that flow downwardly will depend on the design of the cyclone separator and the flow stream conditions, but will usually be 50–90 wt. percent particle removal by the separator. The resulting gas stream containing reduced concentration of finer particulates is removed overhead from the upper end of the cyclone separator, and flows to a gas cooling means and step which can be achieved either by removing heat by a heat exchanger against a cooler fluid such as water, or by directly injecting a cooler medium such as water into the hot overhead gas stream from the cyclone separator. The reduced concentration of finer particles limits fouling of any heat exchanger surface which may follow the cyclone separator. In the gas cooling means and step, the gas temperature is reduced to a level at which the condensable species to be removed from the feed gas will be condensed out of the cooled gas stream and be solidified on the particles. These particles are then conveyed from the cooler along with the cooled gas stream.

The resulting cooled gas stream enters a filter vessel and passes through a filter element provided therein so as to substantially remove the remaining finer particles and provide a clean gas product stream, which is removed from the filter vessel upper outlet connection. The filter element is sized to remove the remaining fine particles and any condensed and solidified species from the cooled gas stream. By periodically back flowing a pressurized cleaning gas stream through the filter elements or by other suitable means, the fine particles collected on the filter element are removed from the filter element and fall to the bottom portion of the filter vessel.

The coarser solid particles that are removed in the cyclone separator flow downwardly into the bottom portion of the filter vessel through a conduit containing differential pressure sealing means, which can be either a non-mechanical type valve such as a fluidized solids J-valve, or a comparable mechanical device, that allows downward solids flow while sealing the differential pressure existing between the cyclone separator and the filter vessel.

An insulating heat shield is provided between the hot coarser solids in the downcomer conduit and the cooled gas stream to limit heat transfer from the hot particles passing downwardly through the downcomer dipleg conduit to the cooled gas/fine particulate stream entering the filter vessel. The fine particles filtered from the cooled gas stream and the coarser solids stream mix together in the bottom portion of the filter vessel. Such mixing of the finer and coarser solid particles in the filter vessel provides for improved withdrawal of all the mixed solids from the filter vessel, as compared to withdrawing a solids stream that consists of only the fine size particles.

This invention also provides a method for separating particulate solids and condensable vapor materials from a feed gas stream such as a hot fuel gas stream, so as to provide a clean product gas stream. The method includes first passing the feed gas stream through a gas-solids separation step, withdrawing a stream of coarse solids downwardly into a filter vessel, removing an overhead gas stream containing a reduced concentration of fine particulate solids and cooling the gas stream to facilitate condensation and solidification of the condensable species, then filtering out the fine size solids and condensed material, while the cleaned gas stream is removed from the upper portion of the filter vessel. The resulting fine solids are mixed with the coarser solids in the lower portion of the filter vessel, after which the mixed solids are withdrawn from the filter vessel.

DESCRIPTION OF DRAWINGS

This invention will be further described with reference to the following drawings, in which.

DESCRIPTION OF INVENTION

Figure 1:
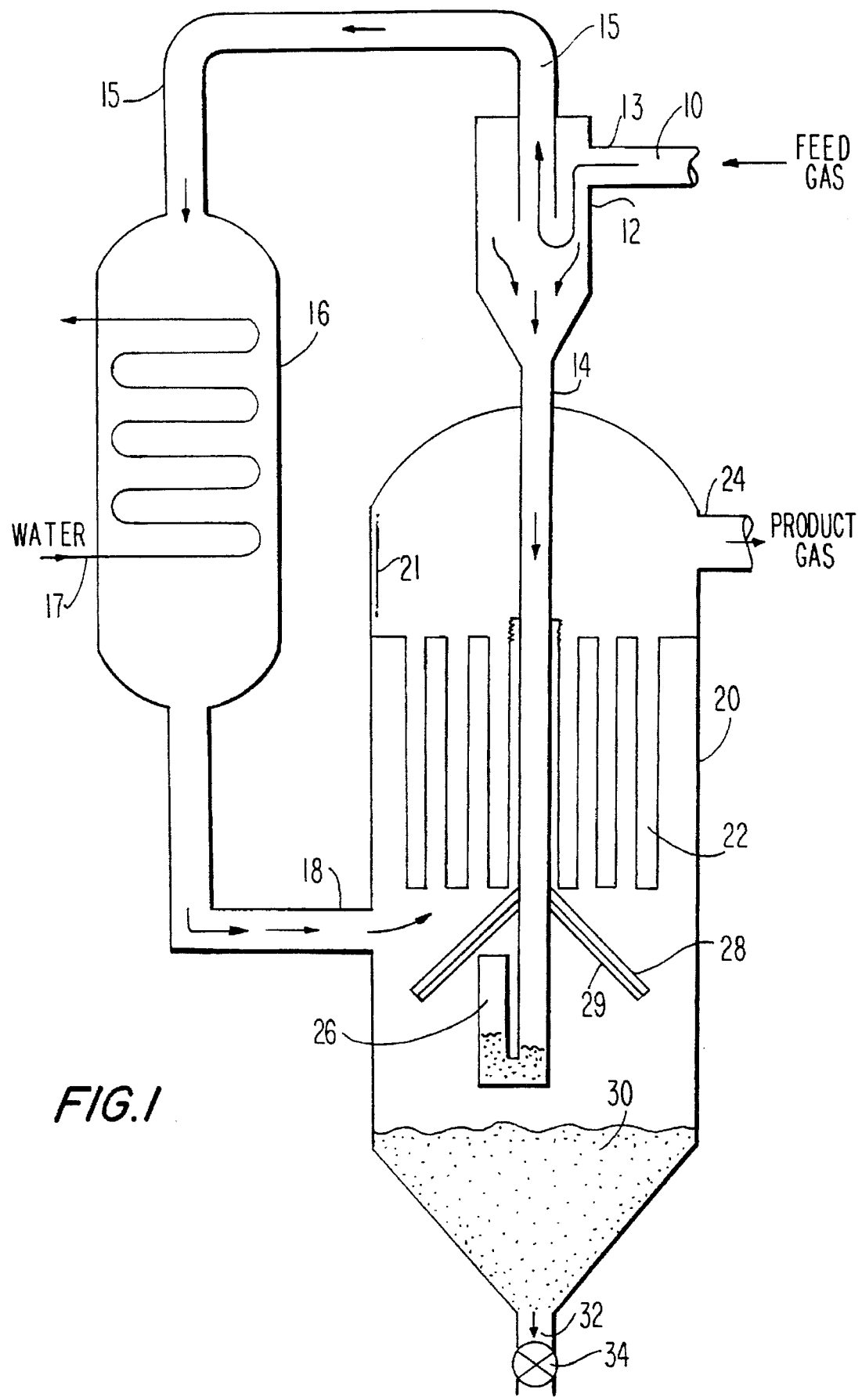
FIG. 1 is a schematic flow diagram of a solids separation system for a gas feed stream, including a cyclone separator, gas cooler and a filter vessel for effective removal of particulate solids and condensed species from the gas stream.

The system according to the invention is used for removing particles and condensable species from a gas-particulate solids feedstream such as a fuel gas stream containing such materials, so as to produce a clean gas stream such as fuel gas for combustion in gas turbines. As shown in FIG. 1, a combined gas/particulate solids stream such as from a coal gasification process and having temperature of 500°–2,000° F. and at pressure of 50–250 psig is provided at 10, and enters a cyclone type gas-solids separator 12 at tangential inlet conduit connection 13. The gas feedstream will usually contain 0.5–80 wt. % solid particles. The top size of the particle size distribution would usually be 50–4,000 microns.

In the separator 12, most of the larger size particles contained in gas stream 10 such as larger than about 200 microns are centrifugally captured and flow downwardly preferably through a centrally located lower dipleg conduit 14 into a filter vessel 20. The portion of the particles that are removed and flow downwardly through conduit 14 will depend on the design of the cyclone separator and the flow stream conditions, but will usually be 50–90 wt. % of the solids contained in the feed stream 10. The gas stream exiting overhead through conduit 15 from the cyclone 12 will contain a reduced concentration of particulates, which will limit fouling of the heat exchanger surfaces located in a gas cooler unit 16 which is flow connected by conduit 15 and provided downstream from the cyclone separator 12. In the gas cooler unit 16, the gas stream temperature from conduit 15 is cooled to a level at which the condensable species to be removed will condense out of the gas stream and solidify on the solid particles contained therein. Gas stream cooling can be accomplished in the heat exchanger 16 against a cooling stream at 17 such as water. Alternatively, such cooling of gas stream in conduit 15 can be done by directly injecting a cooler medium such as water into the hot gas stream at 15. The condensed and solidified material, such as potassium chloride and sodium chloride, will be conveyed from the cooler unit 16 by the flowing gas through conduit 18 into the filter vessel 20.

The resulting cooled gas at 18 enters the filter vessel 20 and passes upwardly through filter elements 22 provided therein to provide clean product gas at outlet 24. The filter elements 22 are located adjacent to and preferably surrounding the central downcomer conduit 14, and have porosity and surface area sized to effectively filter out the remaining fine particles and remove any condensed species from the cooled gas stream at 18. The filter elements are usually formed of sintered metal powder, but for gas temperatures above 800° F. ceramic filter elements are usually used. Particles collected on the filter elements 22 are periodically removed from these elements by back flogging a gas through the filter elements 22 or by other suitable means, and the particles fall into bed 30 located in the bottom portion of the filter vessel 20. For feedstream gas temperatures above about 600° F. the cyclone separator 12 and filter vessel 20 are usually thermally insulated internally at 21 with an anchored castable refractory material or an encapsulated heat resistent blanket type material.

The coarser solids that are collected in the cyclone separator dipleg conduit 14 flow downwardly into the bottom portion of the filter vessel 20 preferably through a non-mechanical type valve such as a J-valve 26 containing fluidized particles, or through other suitable mechanical device that allows downward solids flow while sealing the differential pressure existing between the cyclone separator downcomer conduit 14 and the filter vessel 20. A thermally insulated heat shield 28 is provided between the gas conduit 18 and the downcomer conduit 14, so as to limit the heat transfer from the hot solid particles flowing downwardly through the cyclone dipleg 14 to the cooled gas/particulate stream entering the filter vessel 20 at conduit 18. The heat shield 28 can be supported either from the downcomer conduit 14, or from the inner wall of the filter vessel 20, and may also include a thermal insulation layer 29 provided on the shield lower side adjacent to the J-valve 26.

The particles from the cooled gas stream at 18 which are removed by the filter 22 and the solids in cyclone solids stream at 14 mix together in the bed 30 located in the bottom portion of the filter vessel 20. This mixture of the finer and coarser solid particles is withdrawn uniformly from the filter vessel 20 at bottom connection 32 containing control valve 34. The mixture of coarse and fine particles in bed 30 flows better than a solids stream consisting of only very fine particles, i.e. smaller than about 50 microns.

Figure 2:
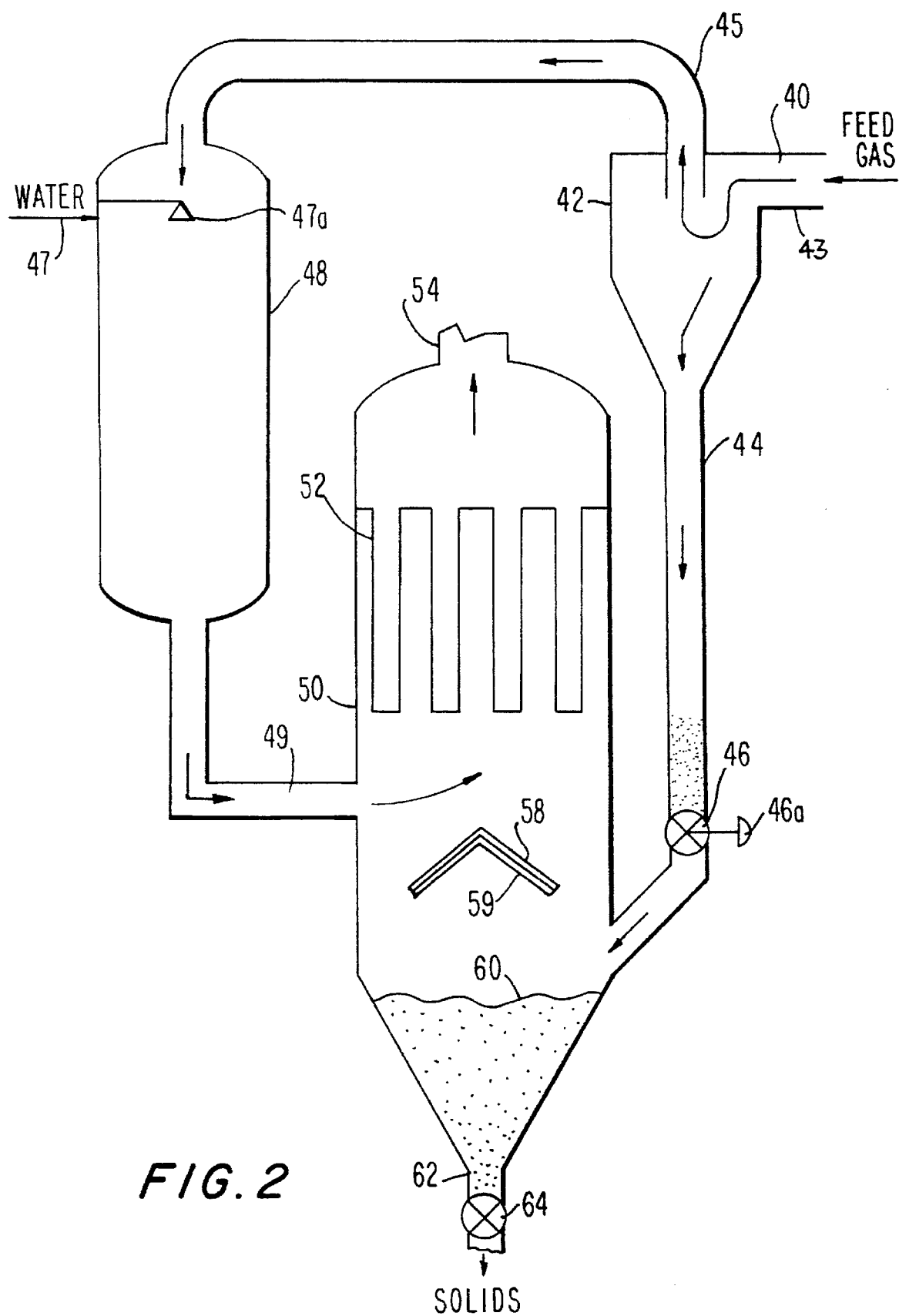
FIG. 2 is a schematic flow diagram of an alternative solids separation system utilizing an external cyclone separator which is flow connected to a gas cooler and filter vessel for removal of particulates and condensed species to provide a cleaned product gas stream.

An alternative configuration for the gas-solids separation system is shown by FIG. 2, in which a hot feed gas stream at 40 is passed to cyclone separator 42 which is externally located separate from a filter vessel 50. The larger particles in the gas feedstream 40 are centrifugally removed downwardly through external conduit 44 and through a mechanical type valve device 46, for which operation is controlled by a controller unit 46a which senses differential pressure between the downcomer conduit 44 and the filter vessel 50. The gas stream removed overhead at 45 and containing a reduced concentration of particulate solids is passed to cooler vessel 48, where the gas is cooled by the evaporation of water injected at 47 through spray nozzle 47a and mixed with the gas. The resulting cooled gas at conduit 49 is passed into the filter vessel 50 and through filter elements 52 contained therein to remove any remaining solid particles, which are collected in a solids bed 60 located in the lower portion of the filter vessel 50. A clean fuel gas product stream is removed from the filter vessel at upper connection 54.

The coarser particles collected in downcomer conduit 44 are transferred through the valve device 46 into the solids bed 60. A thermal shield 58 is provided between the cooled gas stream from conduit 49 and the solids from downcomer conduit 44 and particle bed 60, so as to limit heat transfer from the hot particulate solids to the cooled gas stream at 49 passing through filter 52. The thermal shield 58 is suitably supported from the filter vessel inner wall, and may also include a thermal insulation layer 59 provided on the shield under side. The resulting mixture of fine and coarse particles in bed 60 are withdrawn from filter vessel 50 through bottom connection 62 containing control valve 64.

This invention will be further described with the aid of an Example, which should not be construed as limiting in scope.

EXAMPLE

A hot fuel gas stream derived from coal gasification and containing particulate solids and some condensable alkali species is introduced into the tangential inlet of a cyclone type gas/solids separator. Coarse particulate solids are removed downwardly through a central conduit to a filter vessel, while a hot gas stream containing a reduced concentration of fine size particulate solids is withdrawn overhead from the cyclone separator. The coarse particles are passed downwardly through a J-valve means into the lower portion of the filter vessel. The overhead gas stream is passed through a heat exchanger in which the gas is cooled to solidify the condensable vapors and then passed through a filtering element provided at an intermediate level in the filter vessel. The resulting cleaned product gas is withdrawn from the filter vessel upper portion, while the mixed fine and coarse particulate solids are withdrawn from the lower portion of the filter vessel.

Typical operational results for the gas/solids separation system are provided below:

| | |
|---|---|
| Gas inlet temperature, °F. | 1,600–1,800 |
| Gas inlet pressure, psig | 220 |
| Solids concentration in inlet gas, wt % | 10 |
| Gas temperature into filter vessel, °F. | 1,100 |
| Coarse particle size from separator, micron | 40–500 |
| Fine particle size from filter micron | 5–40 |

Although this invention has been described generally and in terms of preferred embodiments, it will be understood that modifications and variations can be made within the scope defined by the following claims.

I claim:

1. A system for separating particulate solids and condensable vapors from a feed gas stream, the system comprising:
   (a) a cyclone gas-solids separator having an inlet conduit connection, an upper outlet conduit connection for clean gas overhead flow from the separator and a lower outlet conduit for particulate solids flow, said lower outlet conduit containing valve means for sealing differential pressure in the conduit,
   (b) a filter vessel having its lower portion flow connected to said gas-solids separator lower outlet conduit so as to convey coarse particulate solids from said gas-solids separator into the filter vessel lower portion, said filter vessel having an inlet conduit connection for cleaned gas flow from said cyclone separator upper outlet conduit connection, an upper outlet connection for gas product removal, and a lower outlet connection for solids withdrawal, said filter vessel containing a solids filtering surface element located entirely between the inlet conduit connection and the upper gas outlet connection, and
   (c) gas cooling means flow connected to said cyclone separator upper outlet conduit connection for cooling the cyclone separator overhead clean gas flow stream before it is introduced into said filter vessel through its gas inlet conduit connection from the cooling means, whereby coarser solids particles are removed from the feed gas stream in the cyclone gas-solids separator and passed through the lower outlet conduit to the filter vessel, the clean gas overhead stream containing a reduced concentration of finer solids particles from the cyclone gas-solids separator is cooled and then introduced into the filter vessel, and a cleaned gas product stream is removed from the filter vessel upper outlet connection, the finer particles that pass through the cooling means are retained by the solids filtering surface element in the filter vessel and coarser particles are mixed together with the finer retained particles from the solids filtering surface, and are withdrawn from the filter vessel through its lower outlet connection.

2. The gas/solids separation system of claim 1, wherein said differential pressure sealing valve means provided in said lower outlet conduit for conveying the coarser solids withdrawn from the gas-solids cyclone separator is provided in said filter vessel lower portion below said solids filtering surface element.

3. The gas/solids separation system of claim 1, wherein said gas cooling means is a heat exchanger provided in the upper outlet connecting conduit for the clean gas overhead flow from said cyclone gas-solids separator.

4. The gas/solids separation system of claim 1, wherein said filter vessel includes thermal shielding means for thermally insulating the cooled gas inlet stream flowing in said gas inlet conduit connection from heat of the coarser size solids in said lower outlet conduit from said cyclone gas-solids separator.

5. The gas/solids separation system of claim 2, wherein said differential pressure valve sealing means is a J-valve containing particulate solids provided in the lower outlet conduit from said cyclone gas-solids separator.

6. The gas/solids separation system of claim 2, wherein said differential pressure sealing means is a mechanical valve operated by differential pressure sensing means between the lower outlet conduit and the filter vessel.

7. The gas/solids separation system of claim 4, wherein said thermal shielding means provided in the filter vessel is located between the gas inlet conduit connection and the lower outlet conduit for coarser size particle flow into the filter vessel, and is supported from the lower outlet conduit, so as to reduce heat transfer from hot coarser solid particles flowing downwardly in the lower outlet conduit and the cooler gas stream flowing from the gas cooling means.

8. The gas/solids separation system of claim 4, wherein said thermal shield is conical-shaped and is supported from the filter vessel wall, and has a thermal insulation layer provided on its under side.

9. The gas/solids separation system of claim 1, wherein said filter vessel is thermally insulated internally with a thermal insulation material attached to the vessel wall inner surface.

10. The gas/solids separation system of claim 1, wherein said cyclone separator and coarse solids outlet conduit are located external to said filter vessel.

11. A system for separating particulate solids and condensable vapor species from a feed gas stream, the system comprising:
   (a) a cyclone gas-solids separator having a tangential inlet conduit connection, an upper outlet conduit connection for clean gas overhead flow from the separator, and a lower outlet conduit for coarse particulate solids withdrawal, said lower outlet conduit containing a J-valve containing particulate solids for sealing differential pressure between the higher pressure cyclone gas-solids separator and the lower portion of the outlet conduit;
   (b) a filter vessel having its lower portion flow connected to said gas-solids separator lower outlet conduit, so as to convey coarse particulate solids from said gas-solids separator into the filter vessel lower portion, said filter vessel having an inlet conduit connection for cleaned gas flow, an upper outlet connection for product gas removal, and a lower outlet connection for solids withdrawal, said filter vessel containing a solids filtering surface located entirely between the inlet conduit connection and the upper gas outlet connection for removal of fine solids;

(e) a heat exchanger flow connected to the cyclone separator upper outlet conduit connection for cooling the cyclone separator overhead gas flow stream before it is introduced through the inlet conduit connection into the filter vessel; and (d) a thermal shield provided in said filter vessel between the gas inlet conduit connection from said heat exchanger and the lower outlet conduit for the coarser particulate solids flow, whereby coarser solid particles are removed from the feed gas stream in the cyclone separator and passed through the lower outlet conduit connection to the filter vessel, the clean overhead gas stream containing reduced concentration of finer particles is passed through the gas cooling heat exchanger and through the filtering surface element in the filter vessel, and a cleaned gas product stream is withdrawn from the filter vessel upper outlet connection, the finer particles removed by the filtering surface element and a mixed coarse/fine solids stream are withdrawn from the filter vessel lower outlet connection.

* * * * *